United States Patent [19]
Suzuki et al.

[11] Patent Number: 6,038,631
[45] Date of Patent: Mar. 14, 2000

[54] DATA PROCESSING SYSTEM AND METHOD USING VIRTUAL STORAGE SYSTEM

[75] Inventors: Shinichiro Suzuki, Tokyo; Yoichiro Takeuchi, Urawa; Tadashi Ishikawa, Tokyo; Ikuo Uchihori, Tokyo; Takayuki Yagi, Tokyo, all of Japan

[73] Assignee: Kabushiki Kaisha Toshiba, Kawasaki, Japan

[21] Appl. No.: 08/910,172

[22] Filed: Aug. 13, 1997

Related U.S. Application Data

[63] Continuation of application No. 08/583,858, Jan. 11, 1996, abandoned, which is a continuation of application No. 08/005,776, Jan. 19, 1993, abandoned.

[30] Foreign Application Priority Data

Jan. 20, 1992 [JP] Japan ................................. 4-007218
Jun. 8, 1992 [JP] Japan ................................. 4-147529

[51] Int. Cl.[7] ................................................. G06F 9/46
[52] U.S. Cl. ...................... 710/260; 710/260; 710/261; 710/262; 711/200; 711/202; 711/210; 712/244
[58] Field of Search ................................. 710/260–262; 711/200, 202, 206–208, 210; 712/1–300

[56] References Cited

U.S. PATENT DOCUMENTS

| | | | |
|---|---|---|---|
| 4,589,087 | 5/1986 | Auslander et al. | 364/768 |
| 4,718,008 | 1/1988 | Chang et al. | 364/300 |
| 4,868,744 | 9/1989 | Reinsch et al. | 364/280.3 |
| 5,148,544 | 9/1992 | Cutler et al. | 395/725 |
| 5,161,227 | 11/1992 | Dias et al. | 395/650 |
| 5,218,712 | 6/1993 | Cutler et al. | 395/800 |
| 5,237,700 | 8/1993 | Johnson | 712/244 |
| 5,307,504 | 4/1994 | Robinson et al. | 395/800 |
| 5,483,641 | 1/1996 | Jones et al. | 395/823 |
| 5,619,704 | 4/1997 | Yagi | 710/263 |
| 5,636,366 | 6/1997 | Robinson | 711/163 |

FOREIGN PATENT DOCUMENTS

| | | |
|---|---|---|
| 0 239 181 | 9/1987 | European Pat. Off. |
| 0 463 976 | 1/1992 | European Pat. Off. |

OTHER PUBLICATIONS

Tanenbaum, Andrew S., Structured Computer Organization, 1990, p. 11–13 Prentice–Hall, Inc. (Simon & Schuster), Englewood Cliffs, New Jersey, USA.

Research Disclosure, Apr. 10, 1987, No. 27658, "Prevent Paging While in an Atomic Environment", p. 224.

Research Disclosure, Feb. 10, 1990, No. 31002, "Kernel Critical Section Support for High–Level Language Code", p. 91.

The 18th Annual International Symposium on Computer Architecture, May 1991, Alexander C. Klaiber, et al., "An Architecture for Software–Controlled Data Prefetching", pp. 43–53.

Primary Examiner—Meng-Ai T. An
Assistant Examiner—Stacy Whitmore
Attorney, Agent, or Firm—Oblon, Spivak, McClelland, Maier & Neustadt, P.C.

[57] ABSTRACT

In executing indivisible operations to be executed without being interrupted, pseudo-store instructions PST which do not perform data writing are used to perform a check for the presence or absence in a memory of pages necessary for execution of the indivisible operations. In the event of absence of the necessary pages, the necessary pages are pre-stored in the memory. This prevents the generation of page fault interruptions during the execution of an indivisible operation, thereby enabling the indivisible operation to be implemented on a software basis. A disable interrupt instruction is executed prior to the execution of the indivisible operation as required, and data indicating an address of the disable interrupt instruction is preserved in order to return to the disable interrupt instruction. In the case where an interruption, such as a page fault interruption, which cannot be disabled even in a interrupt disabled state is generated during data processing, processing is resumed from the disable interrupt instruction after the termination of processing for the interruption or an asynchronous interruption, with reference to the address.

13 Claims, 7 Drawing Sheets

FIG. 1

PST (a0)        ST (REGISTER VALUE 0, a0)
PST (a1)        ST (REGISTER VALUE 1, a1)
PST (a2)        ST (REGISTER VALUE 2, a2)
PST (a3)        ST (REGISTER VALUE 3, a3)

```
L2: dint
    L2 ─────► R41 ───── SPECIFIC
                        REGISTER
                        USED IN
                        INTERRUPT
                        DISABLED
                        STATE LD ( a0, R0 )
L1: PST ( a1 ) ─────┐
    PST ( a2 ) ────┐│
    R0*A ───► R1   ││
    R1*B ───► R2   ││
    ST ( R1, a1 ) ─┼┘
    ST ( R2, a2 ) ─┘
    eint
```

DATA PROCESSING SYSTEM AND METHOD USING VIRTUAL STORAGE SYSTEM

This application is a Continuation of application Ser. No. 08/583,858, filed on Jan. 11, 1996, now abandoned; which is a continuation of application Ser. No. 08/005,776, filed Jan. 19, 1993, now abandoned.

BACKGROUND OF THE INVENTION

1. Field of the Invention

The present invention relates to a computer equipped with a virtual storage system and, more particularly, to a virtual storage control system and method that prevent malfunctions due to the occurrence of page faults.

2. Description of the Related Art

Among computer processes, there are some which must be executed indivisibly (continuously, without being interrupted). Such processes are referred to as indivisible operations.

Figure 12:
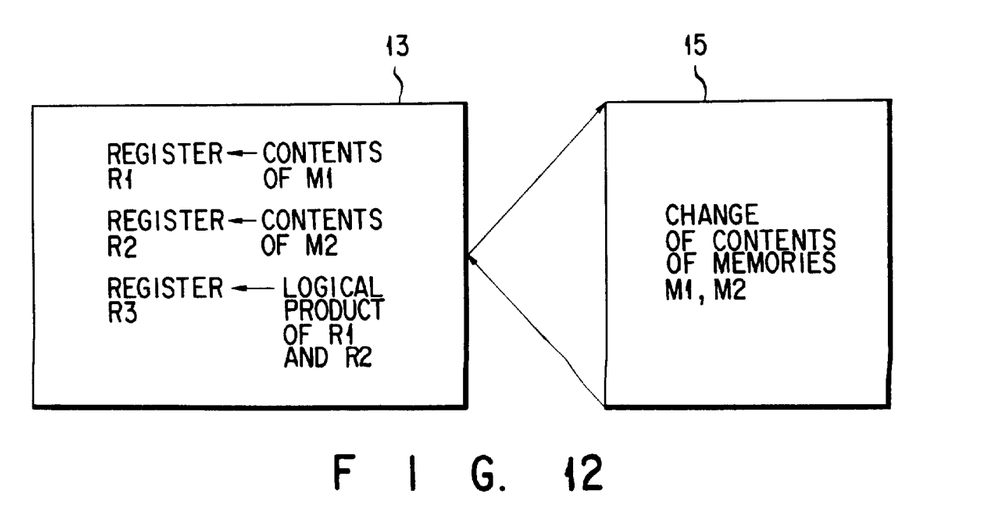
FIG. 12 is a diagram for use in explaining indivisible operations.

Indivisible operations will be described with reference to FIG. 12, which, as an example, shows the execution of a program for storing the logical product of the contents of memories M1 and M2 in a register R3.

A program 13 is executed to store the contents of the memory M1 in a register R1 and the contents of the memory M2 in a register R2. Subsequently, the program 13 obtains and stores the logical product of the contents of the registers R1 and R2 in the register R3.

Assume here that an external interruption (an asynchronous interruption) occurs immediately after the storage of the contents of the memory M1 in the register R1, and an interruption process 15 alters the contents of the memories M1 and M2. As a result, the value of the data placed in the register R2 differs from the expected value, causing an error in the result of the arithmetic operation. For this reason, a series of operations for storing the contents for the memories M1 and M2 in the registers R1 and R2, respectively, and storing the logical product of their contents in the register R3 must be executed continuously, without any interruption operation.

The above indivisible operations may be accomplished by adopting the approach of executing a disable interrupt instruction prior to the execution of the indivisible operations and canceling or releasing the disable instruction after their execution. However, even when such an approach is adopted, there is still a possibility that an exception which can not be disabled will occur, and the indivisible operations cannot be executed continuously. For example, in a demand paging virtual storage computer system, page fault exception cannot be disabled. For this reason, there is a possibility that in spite of execution of a disable interrupt instruction, a page fault exception will occur during reading from the memory M2, the processing will transfer from the page fault exception to another program with higher priority, and the contents of the memory M2 will be manipulated while the other program is being executed.

To circumvent such a problem, indivisible operations have conventionally been implemented by providing pseudo-memory-interlock with software, by a system call, or by executing them as a single instruction with firmware or hardware.

However, the execution of indivisible operations by pseudo-memory-interlock with software entails overhead. The execution of indivisible operations by system call entails overhead (supervisor recall interruption). If the indivisible operations are relatively simple, the overheads will decrease performance.

The indivisible operations realized by hardware or firmware has no flexibility in combination of instructions. In other words, a specific instruction must be used for a specific purpose. Further, use of specific instructions for specific purposes increases the amount of hardware or firmware design, and extends instruction execution time, thus decreasing system performance. Moreover, increasing the amount of hardware or firmware design reduces system reliability. Such factors create significant problems as regards the designing of a RISC (Reduced Instruction Set Computer) architecture computer, in particular.

SUMMARY OF THE INVENTION

It is therefore an object of the present invention to provide a virtual storage computer and a computing method which permit indivisible operations to be executed by use of two or more basic instructions.

It is another object of the present invention to provide a virtual storage computer and a computing method which prevents the occurrence of exceptions which cannot be disabled, such as page fault exception, while indivisible operations are being performed.

It is yet another object of the present invention to provide a virtual storage computer and a computing method which permits the amount of hardware or firmware design to be decreased, and the design performance thus improved.

According to a first aspect of the present invention, there is provided a data processing method based on a virtual storage system comprising the steps of:

checking for the presence or absence in a memory of data to be accessed by instructions contained in a software program defining an indivisible operation, the indivisible operation being to be executed without being interrupted;

reserving required data blocks in the memory when absence of the data blocks in the memory is determined in the checking step; and executing the software program defining the indivisible operation with accessing the memory after presence of the data in the memory is determined in the checking step or the data is reserved in the reserving step.

According to a second aspect of the present invention, there is provided a virtual-storage data processing method comprising the steps of:

disabling an interruption;

executing predetermined data processing in a interruption disabled state;

executing an interrupt processing when an interruption which cannot be disabled even in the interruption disabled state is generated during the execution of the predetermined data processing; and returning to the interruption disabling step or a starting point of the step of executing a predetermined data processing.

According to a third aspect of the present invention, there is provided a virtual-storage data processing apparatus comprising:

first storage means for storing data;

second storage means for storing a copy of part of the contents stored in the first storage means;

third storage means for storing a program containing an instruction set for defining an indivisible operation to be executed without being interrupted and specific instructions, the instruction set containing instructions to perform access of the second storage means, and the specific instructions performing access of the second storage means and reserving data to be accessed by the instruction set;

executing means, connected to the second and third storage means, for executing the program stored in the third storage means by accessing the second storage means; and transferring means connected with the first and second storage means and responsive to the executing means for transferring the data to be accessed from the first storage means to the second storage means, when a data to be accessed is not present in the second storage means, wherein the executing means prevents the generation of interruptions during the execution of the indivisible operation by previously calling the data required to execute the indivisible operations into the second storage means by executing the specific instructions prior to the execution of the indivisible operation, and implementing the indivisible operation.

According to a fourth aspect of the present invention, there is provided a data processing apparatus comprising:

storing means for storing a program containing an interruption disabling instruction, and an instruction set defining data processing in an interruption disabled state;

keeping means for keeping return data required to return to the interruption disabling instruction or first instruction of the instruction set; and means, coupled to the storing means and keeping means, for executing the program, executing an interruption routine when a specific interruption which is allowed even in the interruption disabled state, and, after the termination of the interruption routine, resuming processing from the interruption disabling instruction or the first instruction of the instruction set, in accordance with the return data kept in the keeping means.

In the method and apparatus according to the first and third aspects of the present invention, required data blocks are reserved before the execution of indivisible operations. For this reason, the possibility is reduced that interruptions caused by the absence of data blocks required for the indivisible operations—for example, page fault interruptions—will be generated, thus permitting the indivisible operations to be implemented with software.

In the method and apparatus according to the second and fourth aspects of the present invention, even if an interruption is generated during the execution of data processing, since processing is resumed from the interruption disabling instruction after the execution of interruption processing, operations are executed continuously from the interruption disabling instruction to the interruption enabling instruction. Although, in a demand paging computer, etc., page fault interruptions cannot be disabled in an interruption disabled state, the present invention permits indivisible operations to be implemented in the case where a page fault interruption is generated.

Additional objects and advantages of the invention will be set forth in the description which follows, will in part be obvious from the description, or may become clear through practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, show presently preferred embodiments of the invention, and together with the general description given above and the detailed description of the preferred embodiments given below, serve to explain the principles of the invention.

FIGS. 4A to 4C show a specific application of the first embodiment to a queuing operation; more particularly.

DETAILED DESCRIPTION OF THE PREFERRED EMBODIMENTS

Figure 1:
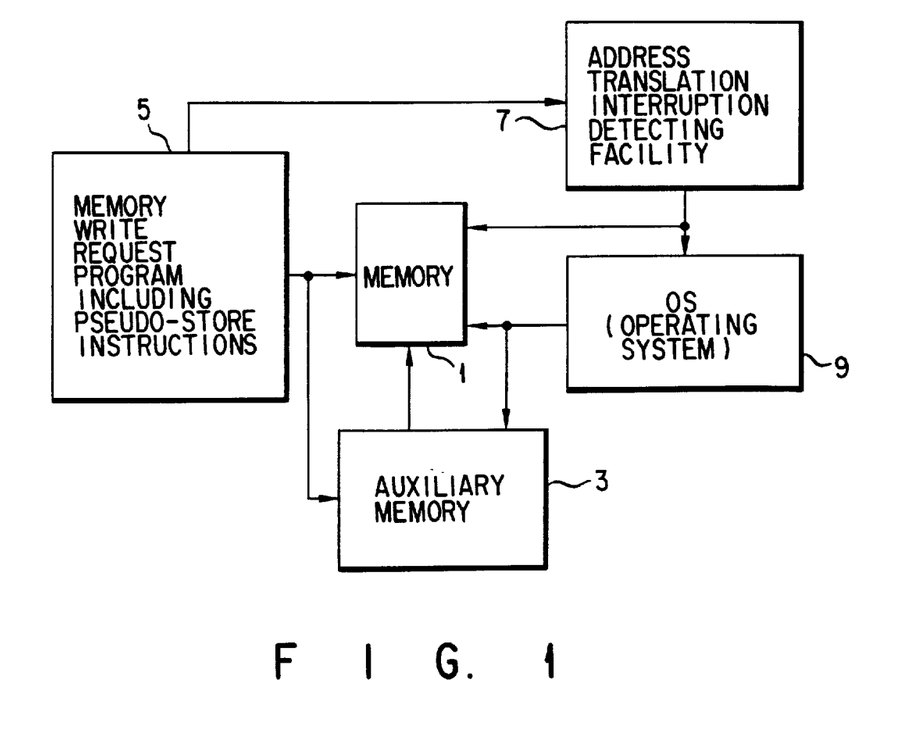
FIG. 1 is a functional block diagram showing a first embodiment of the present invention.

A memory 1 shown in FIG. 1 is a main storage unit. The contents of the memory 1 may be rewritten by a memory write request program 5. An auxiliary memory 3, which has a large storage capacity, stores data in page units. Page-in and page-out are performed between the main memory 1 and the auxiliary memory 3. Each page contains, for example, 2 k bytes of data.

The memory write request program 5 contains usual data processing instructions, such as store instructions, read instructions, arithmetic instructions, and pseudo-store instructions unique to the present invention, and defines a series of data processes.

An address translation interruption detecting facility 7 is responsive to the memory write request program 5 to detect the presence or absence of a desired page to be accessed in the memory 1. In the absence of the desired page in the memory 1, the detecting facility 7 detects a page fault and then passes control to an operating system 9.

In response to the detection of a page fault by the detecting facility 7, the operating system (hereinafter, referred to as OS) 9 transfers the page to be accessed by the memory write request program 5 to the memory 1. At the termination of the transfer, the OS 9 passes control to the highest-priority program at that time.

Figure 2A:
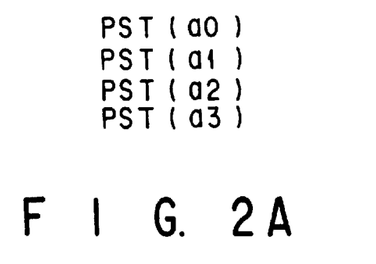
FIGS. 2A and 2B show pseudo-store instructions and store instructions, respectively.
Figure 2B:
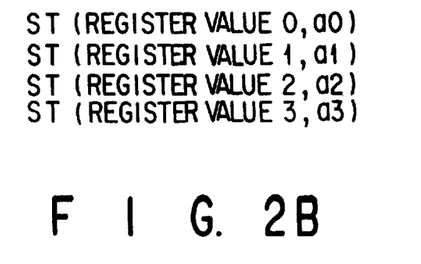

Next, reference is made to FIGS. 2A and 2B for describing pseudo-store instructions (PSTS) unique to the present embodiment, as compared with usual store instructions. The pseudo-store instructions are store instructions which do not actually perform writing of data. Instead, the pseudo-store instructions reserve pages required in memory 1.

As an example, assume that virtual addresses a0, a1, a2, and a3 are contained in pages A0, A1, A2, and A3, respectively, in virtual storage space. The PST(a0) shown in FIG. 2A is a pseudo-store instruction which reserves the page A0 in the memory 1. Likewise, the PST(a1), PST(a2), and PST(a3) are pseudo-store instructions which reserve the page A1, page A2, and page A3, respectively, in the memory 1.

For example, when the PST(a0) is executed in the absence of the page A0 in memory 1, the detecting facility 7 detects a page fault, and the OS 9, in the presence of the page A0 in auxiliary memory 3, transfers data of the page A0 from the memory 3 to the memory 1. In the absence of the page A0 in the auxiliary memory 3, on the other hand, the OS 9 reserves an area for the page A0 in the main memory 1.

Store instructions (ST) used in the present embodiment will hereinafter be described with reference to FIG. 2b. The store instructions have values indicating registers storing data and virtual addresses as parameters, and write data kept in specified registers in specified addresses. In FIG. 2B, ST (register value 0, a0) stores data in register R0 in address a0 within page A0. ST(register value 1, a1) stores data in register R1 in address a1 within page A1. ST(register value 2, a2) stores data in register R2 in address a2 within page A2. Finally, ST(register value 3, a3) stores data in register R3 in address a3 within page A3.

Figure 3:
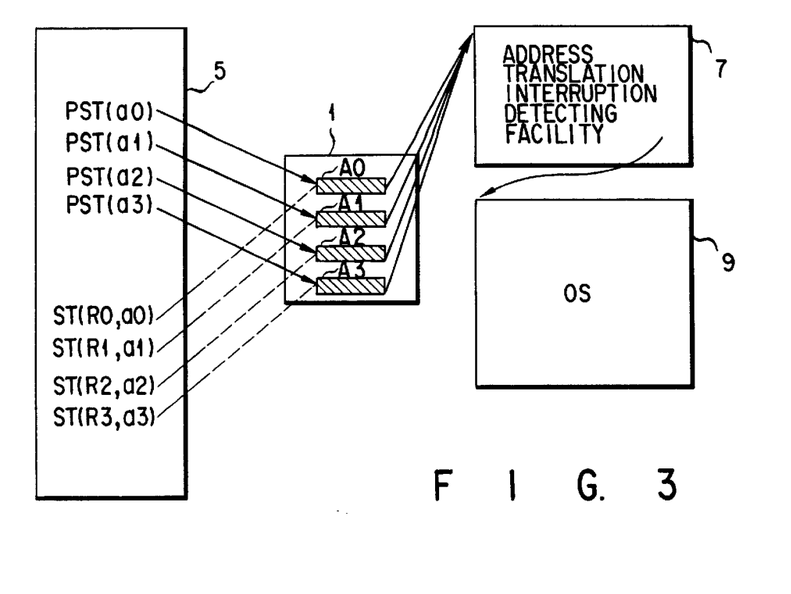
FIG. 3 shows the operation of the computer according to the first embodiment.

Next, the flow of data processing in the present embodiment will be described, with reference to FIG. 3.

Since, in the present embodiment, indivisible operations are carried out by a combination of basic instructions, pseudo-store instructions are arranged ahead of a program for indivisible operations. In other words, the virtual storage type of computer according to the present embodiment executes pseudo-store instructions corresponding to store instructions contained in the indivisible operations immediately prior to the execution of the indivisible operations containing the store instructions.

For example, when the indivisible operations contain the store instructions ST(register value 0, a0), ST(register value 1, a1), ST(register value 2, a2), and ST(register value 3, a3) shown in FIG. 2B, a user places corresponding pseudo-store instructions PST(a0), PST(a1), PST(a2), and PST(a3) immediately before the program defining the indivisible operations.

The computer therefore executes PST(a0), PST(a1), PST (a2), and PST(a3) prior to the execution of the indivisible operations and checks for the presence or absence of page A0, page A1, page A2, and page A3 in the memory 1. For example, when the page A1 is not present in the memory 1, the address translation interruption detecting facility 7 detects a page fault for page A1 and then passes control to the OS 9. The OS 9 reserves the page A1 in the memory 1 and then transfers the initial value data of the page A1 or, if data has been written into the page A1 before, the data to that page in the memory 1. During the data transfer to the page A1 in the memory 1, the OS 9 passes control to another program with the highest priority at that time. On completion of the data transfer, the OS 9 returns control to the program 5.

Subsequently, the memory write request program 5 executes indivisible operations containing store instructions ST for writing data into the memory 1. In this case, required pages have been reserved in advance in the memory 1 by the execution of the pseudo-store instructions. Therefore, when writing data into the memory 1, the generation of page fault exception can be prevented during indivisible operations.

Next, an application of the present embodiment to a process of inserting an element B between elements A and C making up a bi-directional queue will be described, with reference to FIGS. 4A to 4C.

Figure 4A:
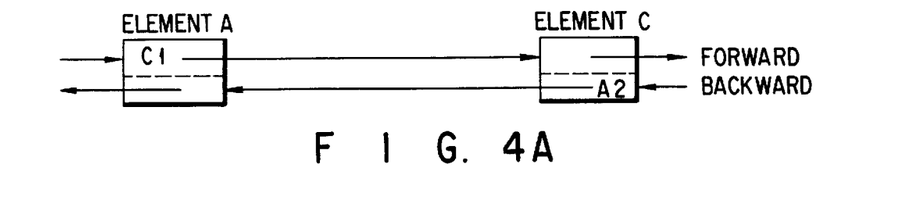
FIG. 4A shows elements A and C making up a queue.
Figure 4B:
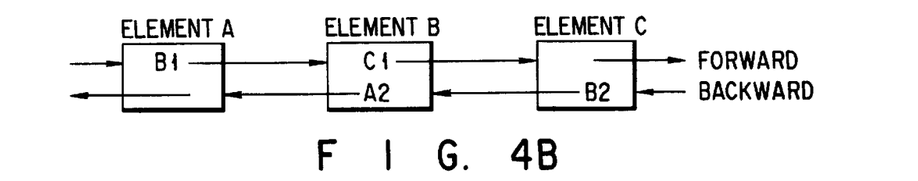
FIG. 4B shows the state in which an element B is inserted between elements A and C.
Figure 4C:
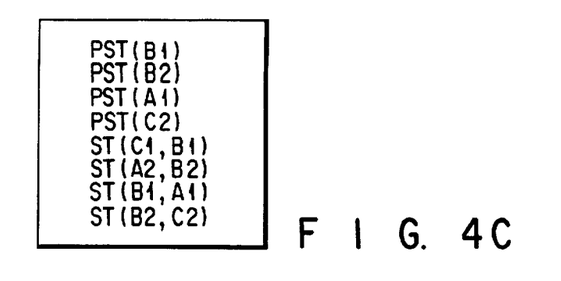
FIG. 4C shows an example of a program for inserting element B between elements A and C.

FIG. 4A shows elements A and C making up a bi-directional queue, FIG. 4B shows the state in which an element B is inserted between the elements A and C, and FIG. 4C shows an example of an insert program.

The bi-directional queues shown in FIGS. 4A and 4B are a kinds of bi-directional first-in-first-out buffer. In the queue shown in FIG. 4A, data is transferred from the elements A to C (forward data chain) or from the elements C to A (backward data chain). In the queue shown in FIG. 4B, data is transmitted through the elements A, B, and C in this order (forward data chin) and elements C, B, and A in this order (backward data chain).

Each element is formed of a storage area of a memory device. In FIGS. 4A and 4B, assume that the addresses of areas used in the forward data chain of the elements A, B, and C are A1, B1, and C1, respectively, and the addresses of areas used in the backward data chain are A2, B2, and C2, respectively. The transfer destination addresses are written in the boxes representing the elements. The transfer destination addresses are written in the boxes representing the elements. The transfer destinations from element C in forward data chain and from element A in backward data chain are omitted.

In the case of the forward data chain, in order to place the element B between the elements A and C, it is required that the transfer destination address of element A be B1, and the transfer destination address of element B be C1. In the case of the backward data chain, it is necessary that the transfer destination address of element C be B2, and the transfer destination address of element B be A2. Thus, the store instructions ST(C1, B1), ST(A2, B2), ST(B1, A1), and ST(B2, C2) are executed to rewrite the data transfer destination address of each area. If a page fault were generated during rewriting of the destination addresses, control were transferred to interruption processing, and the queue were manipulated by the interruption processing, the queue structure would be destroyed. For this reason, the four store instructions must be executed continuously without being externally interrupted.

In the present embodiment, therefore, the pseudo-store instructions PST(B1), PST(B2), PST(A1), and PST(C2) are executed prior to the execution of the store instructions ST as shown in FIG. 4C, thereby placing required pages in the memory 1. Subsequently, the store instructions ST(C1, B1), ST(A2, B2), ST(B1, A1), and ST(B2, C2) are executed to write the transfer destination addresses into the memory 1. In other words, the execution of the pseudo-store instructions allows pages required for indivisible operations at the time of the execution of the store instructions to be placed in the memory, thus preventing page faults from occurring during the execution of the indivisible operations.

In the first embodiment, there is no assurance that the indivisible operations will be performed in the case where another program with a high priority, and to which control is transferred after the termination of the page fault exception processing, uses a large amount of memory. This point will be described with reference to FIG. 5, taking, as an example, a case where a program 5 stores data stored in registers R0, R1, and R2 into addresses a0, a1, and a2 included in page A0, A1, and A2 by store instructions ST(R0, a0), ST(R1, a1), and ST(R2, a2) respectively.

Figure 5:
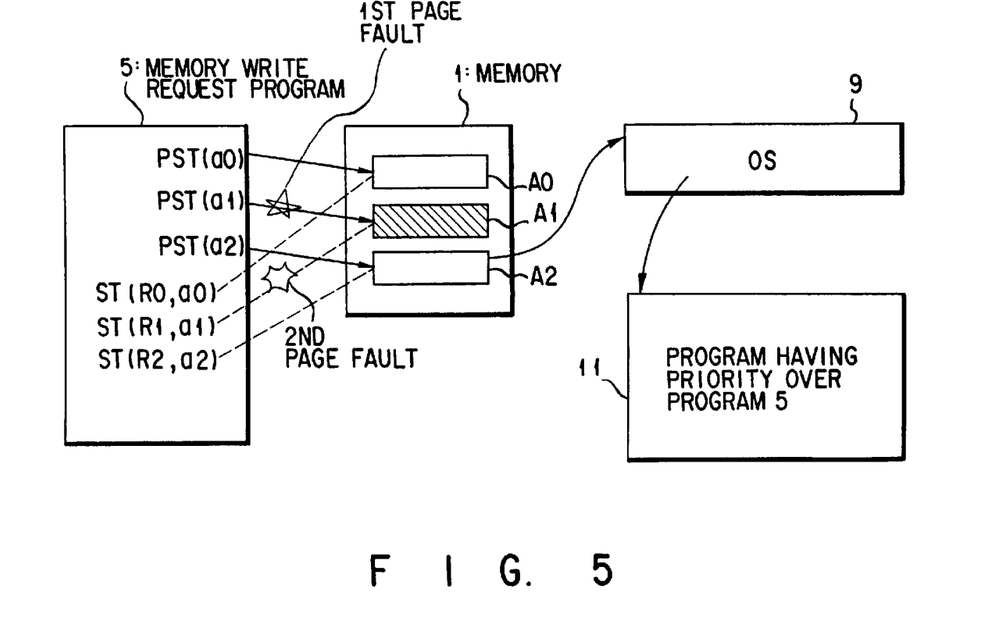
FIG. 5 is a diagram for use in explaining possible problems with the first embodiment and methods for solving them.

First, program 5 executes pseudo-store instructions PST (a0), PST(a1), and PST(a2) to check whether or not the pages A0, A1, and A2 have been reserved in memory 1. When a page fault (first page fault) is detected for the page A2, control is transferred to the OS 9, so that OS 9 reserves the page A2 in the memory 1. When there is a program 11 having priority over program 5 for the purpose of multitasking, asynchronous interruption handling, etc., the OS 9 passes control to the program 11 after reserving. It is assumed that the program 11 has used such a large amount of memory as to suppress the system working set, and thus page A1 has been pushed out of memory 1. Subsequently, the program 5 receives control and then executes store instruction ST(R1, a1) for writing the data stored in the register R1 at an address in the page A1, with the result that a page fault (second page fault) is generated. Consequently, the executing of indivisible operations cannot be ensured.

The following measures may be taken against this problem.

The first measure is to make page checks by use of the pseudo-store instructions from the beginning, after the interruption processing performed due to the first page fault exception. The second measure is to keep pages which have been reserved in the memory 1 by the execution of the pseudo-store instructions until the completion of the execution of the store instructions in the indivisible operations. Hereinafter, a description will be given of a second embodiment of the present invention which utilizes such measures.

Second Embodiment

Figure 6:
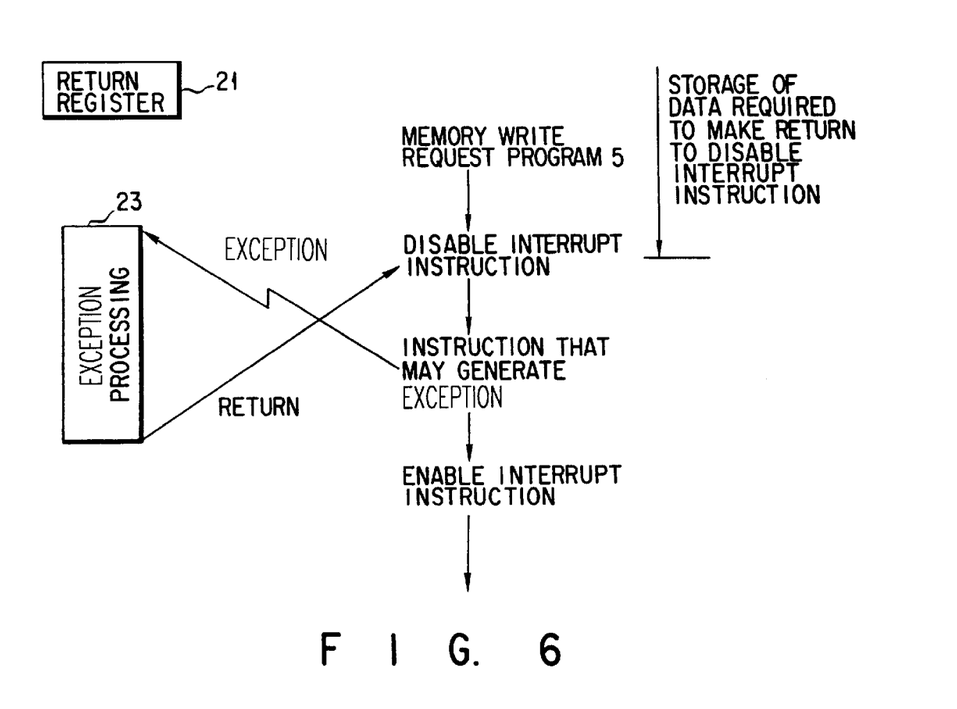
FIG. 6 is a flowchart schematically depicting a second embodiment of the present invention.

The flow of data processing in the second embodiment will be described with reference to FIG. 6.

First, in order to execute the indivisible operations, the computer issues an external or asynchronous interruption inhibit (or disable) instruction and executes it. Simultaneous with or prior to the issuing of the interruption inhibit instruction, data (program counter value) required to indicate the destination of return from the interruption processing the interruption inhibit instruction is stored in a return destination register 21. Next, a program 5 is executed which contains an instruction which may generate an exception that cannot be inhibited even in the interruption inhibit state. Subsequently, the interruption inhibit state is released. When the exception occurs, the contents of the return destination register 21 are referred to after the termination of interruption processing 23, so that the program 5 is re-executed from the interruption inhibit instruction.

Use of such a procedure permits the program 5 to be re-executed from the interruption inhibit instruction following completion of an interruption processing 23. Finally, at the point of time the exception ceases occurring, the program covering the interruption inhibit instruction to the interruption inhibit release instruction is executed continuously.

In the second embodiment, therefore, instructions from the interruption inhibit instruction to the last one of the instructions by which the exception may be generated are made re-executable. Thus, execution of indivisible operations ranging from the interruption inhibit instruction to the interruption inhibit release instruction can be ensured.

Figure 7:
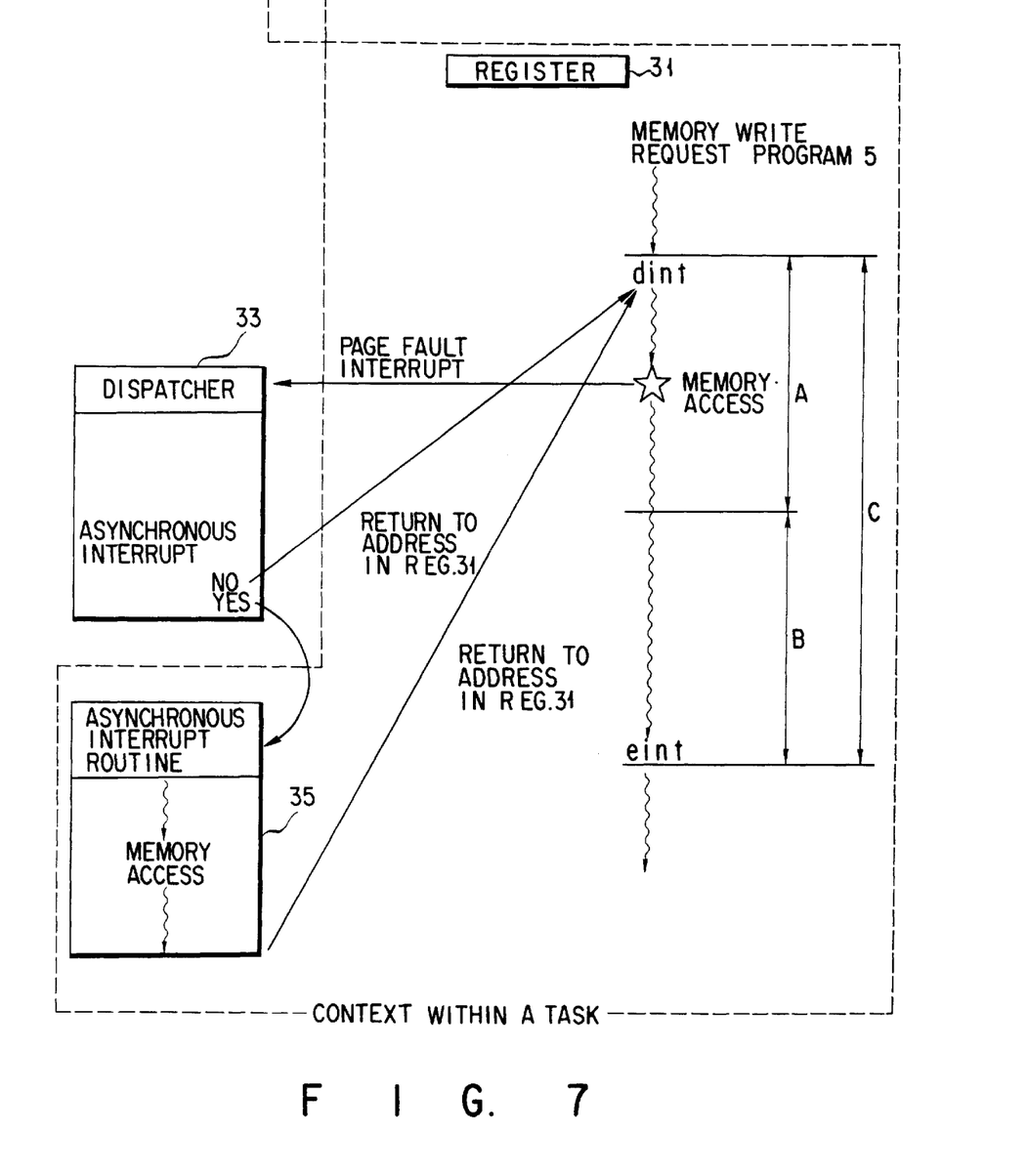
FIG. 7 is a flowchart showing the operation of the second embodiment of FIG. 6 in detail.

Next, reference is made to FIG. 7, to describe an application of the second embodiment to a demand paging computer system.

A demand paging computer, even in an interruption inhibit or pending state, cannot prevent the occurrence of a page fault exception when involved in executing instructions associated with memory access, such as load instructions or store instructions. In this specification, page-fault-dependent exceptions, including address translation interruptions, are generically referred to as page fault exceptions.

In FIG. 7, in order to implement indivisible operations with software, the memory write request program 5 is made up as follows. First, the indivisible operations are divided into A and B sections, the B section containing at least store instructions in the indivisible operations to be executed, while the A section contains pseudo-store instructions corresponding to the store instructions in the B section. The A section is headed by a disable interrupt (dint) instruction, and the B section is ended by an enable interrupt (eint) instruction by which the disable interrupt state is released. Even if the A section is executed repeatedly, the value in the register referred to at the beginning of the A section remains unchanged, with no writing of data into the memory 1. In other words, the A section is re-executable.

For example, the store instructions shown in FIG. 2B are placed in the B section, and other instructions and the pseudo-store instructions shown in FIG. 2A are placed in the A section.

Next, the procedure for executing the indivisible operation section C of the memory write request program 5 will be described.

First, the program 5 issues (executes) an instruction dint for disabling an interruption or making an interruption pending. In response to the disable interrupt, the system preserves the address of the disable interrupt instruction dint in the return destination register 31.

Next, the system executes the A section of the program. When a page fault occurs during the execution of the A section, control is transferred to a dispatcher 33. Usually, the system saves the contents of the program counter at the time of the occurrence of an interruption as the return address at the time of return from the page fault exception processing. In the present embodiment, however, since external interruption is disabled or made pending, the system saves data kept in the return destination register 31 as the return address.

Next, the dispatcher 33 transfers a required page from the auxiliary memory 3 to the main memory 1. After the termination of the transfer, the dispatcher 33 checks whether or not an asynchronous interruption (external interruption) has been generated. If no asynchronous interruption has been generated, then the data processing is resumed from the disable interrupt instruction dint on the basis of the saved address.

When the dispatcher 33 detects that an asynchronous interruption has been generated, and an asynchronous interruption routine 35 to be executed at the time of the generation of the asynchronous interruption has been defined (a user has described it in a source program), then control is transferred to the asynchronous interruption routine 35. Upon completion of the asynchronous interruption routine 35, control is transferred to the memory write request program 5, so that the processing is resumed from the disable interrupt instruction dint on the basis of the saved address.

On the other hand, if no page fault occurs throughout execution of the A section, then the B section of the program is executed as is. Even if instructions associated with memory access, such as load instructions, store instructions, are executed in the B section, since the pseudo-store instructions have been executed in the A section, pages to be accessed by the instructions have been reserved in the memory 1. For this reason, no page fault exception can be generated. As a result, the C section comprised of the A section and the B section can be executed without a page fault being generated.

In the case of the above configuration, there may occur a situation in which a page fault exception is generated while the A section of the program is being executed, and the asynchronous interruption routine 35 will change the contents of the memory 1. However, since the destination of return from the asynchronous interruption routine 35 is the disable interrupt instruction, and the memory write request program 5 is resumed from the disable interrupt instruction dint, no inconsistency will arise when processing the memory write request program 5.

Third Embodiment

A third embodiment of the present invention will now be described, with reference to FIGS. 8 through 11.

Figure 8:
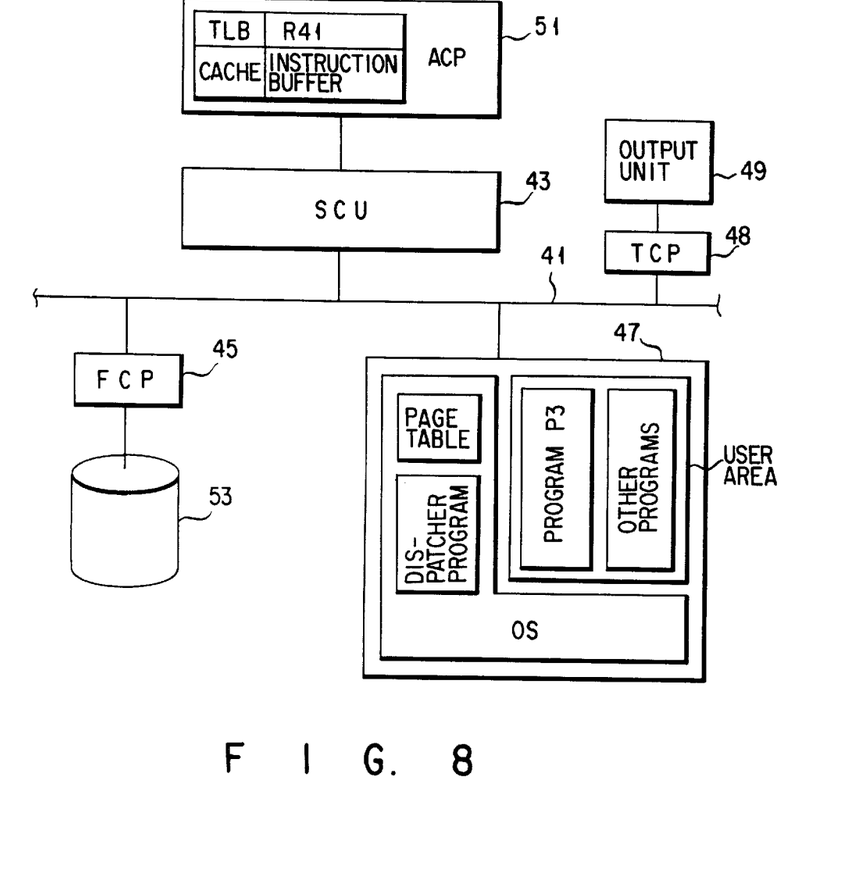
FIG. 8 shows a configuration of a computer according to a third embodiment of the present invention.

In FIG. 8, a system control unit (SCU) 43, a file control processor (FCP) 45, a memory 47, a terminal control processor (TCP) 48, and an output unit 49 are interconnected by a system bus 41. An arithmetic control processor (ACP) 51 is connected to the system control unit 43. Connected to the file control processor 45 is an auxiliary memory unit 53, such as a disk unit.

The arithmetic control processor 51 is equipped with an instruction buffer, a cache memory, and a TLB, and performs an arithmetic operation in accordance with a program. The system control unit 43 controls the operation of the entire system in accordance with a program.

Under control of the system control unit 43, the file control processor 45 executes inputting and outputting of data to the auxiliary memory unit 53, for example, and DMA transfers of data between the auxiliary memory unit 53 and the memory 47.

The memory 47 is provided with an area for storage of an operating system (OS) containing a dispatcher program, an area for storage of data, and an area available for the user. In the user area, a memory write request program P3 and other programs are stored.

The output unit 49 outputs the results of arithmetic operations performed by the arithmetic control processor 51, etc.

Figure 9:
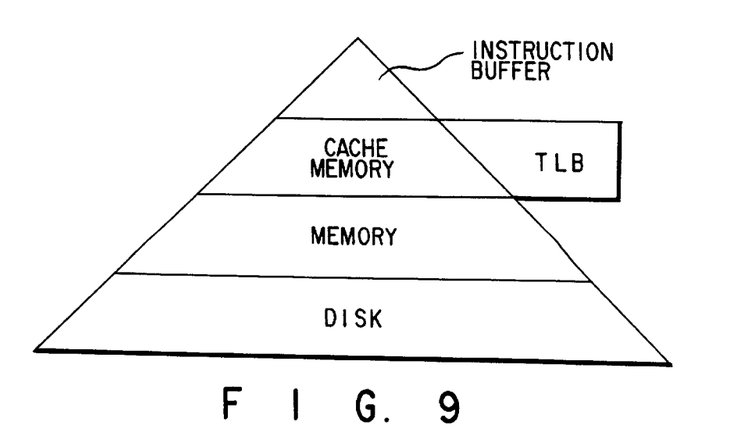
FIG. 9 is a diagram for explaining the storage structure of the computer shown in FIG. 8.

The memories shown in FIG. 8 are classified according to capacity and operating speed, as shown in FIG. 9. The instruction buffer is the fastest and the smallest in capacity, followed by the cache memory, the memory 47, and the auxiliary memory unit 53 in descending order of speed and in ascending order of capacity.

The memory 47 stores part of the data stored in the auxiliary memory unit 53 in block (e.g., page) units, the cache memory stores part of the data stored in the memory 47 in block units, and the instruction buffer stores instructions stored in the cache memory which are to be executed.

Next, the operation of the system shown in FIG. 8 will be described, taking the execution of a program P3 shown in FIG. 10 by way of example. The program P3 performs the following operations: disabling interruption by the disable interrupt instruction dint; loading the data stored in address a0 into the register R0 by load instruction LD; restoring pages A1 and A2 including address a1 and a2 on the main memory by the pseudo-instructions PST; multiplying value stored in register R0 and a constant A and storing the product into the register R1; multiplying value stored in register R1 and a constant B, and storing the product into the register R2; writing values held in registers R1 and R2 into addresses a1 and a2, respectively, by store instructions ST; and enabling interruptions by enable interrupt instruction eint. The step "L2→R41" writes the address L2 into the register R41. If a page fault later occurs, the step at address L2 will be executed after the page fault processing is completed instead of containing execution at the step which caused the page fault. FIG. 11 is a flowchart showing processing associated with the program P3.

First, the arithmetic control processor 51 fetches, decodes, and executes instructions of the program P3 in sequence, under control of the system control unit 43.

When the processing progresses to the point where the arithmetic control processor 51 fetches a disable interrupt instruction dint, the processor disables interruption (step S1), and keeps in a register R41 an instruction address L2, a program status word, and a value kept in each register (step S2).

Next, the instruction LD(a0, R0) is encountered which writes the value at address a0 into register R0.

When the processing further progresses to the point where the arithmetic control unit 51 fetches a pseudo-store instruction (e.g. PST(a1) and PST(a2)), the processor refers to the TLB to check for the presence or absence of a page specified by the pseudo-store instruction in the memory 47 (step S3). In the event of an entry of the page being absent from the TLB, reference is made to a page table or a segment table in the memory 47, to set address translation information about the page into an empty entry area in the TLB. A check is likewise made for the presence of the page. If, as a result of the check, the page specified by the pseudo-store instruction is found in the memory 47, then the flow advances to processing of the next instruction.

In the event of the page specified being absent from the memory 47, the arithmetic control processor 51 checks whether the interruption is disable. If the interruption is disabled, the flow goes to step S11 (normally, the flow goes to step S11 because of the step S1). In step S11, the arithmetic control processor 51 issues a page fault exception. The return information (a program status word, etc.) is saved in an interruption stack. As the return address in the return information, the address L2 kept in the register R41 is saved in the stack in place of the program counter value. When it is detected that the interruption is enable, the flow goes to step S10 (this situation will not occur in a normal situation because of the step S1).

Subsequently, a page fault exception handler receives control, so that the arithmetic control processor executes a paging process (step S12). In the paging process, the arithmetic control processor 51 checks the page cache (software-implemented page cache facility) in the memory 47. Specifically, a check is made to determine the presence or absence of the page specified in a page cache area in the memory 47. In the event of the page specified being present in the page cache area in the memory 47, a paging routine, i.e., a pager, makes the page valid.

In the event of the page specified being absent from the page cache area in the memory 47, on the other hand, the paging routine reserves a page area. Further, if there is initial value data of the page, or if data has been written into the page before, the paging routine causes the system control unit 43 to control the file control processor 45, thereby DMA-transferring the page data from the auxiliary memory 53 to the memory 47.

When the DMA-transfer of data from the auxiliary memory 53 to the memory 47 is not performed after the termination of the paging process (step S12), the arithmetic control processor 51 places the address L2 of the dint instruction saved in the stack into the program counter, and register data and the like into their original locations (step S14). As a result, the arithmetic control processor 51 is allowed to re-execute the program P3 from the dint instruction.

On the other hand, when the DMA-transfer is performed, the arithmetic control processor 51 transfers control to a program with a higher priority. Control returns to the program P3 at the termination of the data transfer. Immediately after that, the arithmetic control processor 51 checks interrupt occurring conditions recorded in a specific area within the system. Specifically, a check is made for the presence or absence of asynchronous interruptions (external interruptions) generated to the program P3 (step S13). In the event of there being no asynchronous interruption, the arithmetic control processor 51 places the address L2 of the dint instruction saved in the stack into the program counter, and register data and the like into their original locations (step S14). As a result, the arithmetic control processor 51 re-executes the program P3 from the dint instruction.

If, on the other hand, it is decided in step S13 that an asynchronous interruption has been generated, an inherent information area of the program is examined. If, as a result, it is found that an asynchronous interruption routine corresponding to the source of the asynchronous interruption—for example, a disk I/O termination interrupt or a timer interrupt issued by the program itself—has been defined within the program, then the flow transfers to an asynchronous interruption routine.

First, the arithmetic control processor 51 executes the asynchronous interrupt processing (step S21). After the termination of the asynchronous interrupt processing, the arithmetic control processor 51 places the address L2 of the dint instruction saved into the program counter, and register data and the like into their original locations (step S22). As a result, the arithmetic control processor 51 re-executes the program P3 from the dint instruction.

In this way, the processing of the memory write request program P3 is resumed from the dint instruction.

The arithmetic control processor 51 repeats the above processing whenever it fetches a pseudo-store instruction.

At the time of completion of the execution of all the pseudo-store instructions without a page fault being generated, all pages necessary for execution of the store instructions are reserved in the memory 47. As a result, the instructions ranging from the disable interrupt instruction dint to the enable interrupt instruction eint can be executed continuously.

It should be noted that in the event of there being no data to be loaded or stored in the cache memory, a data block containing data to be accessed is transferred from the memory 47. This data transfer is not accompanied by an interruption.

Figure 10:
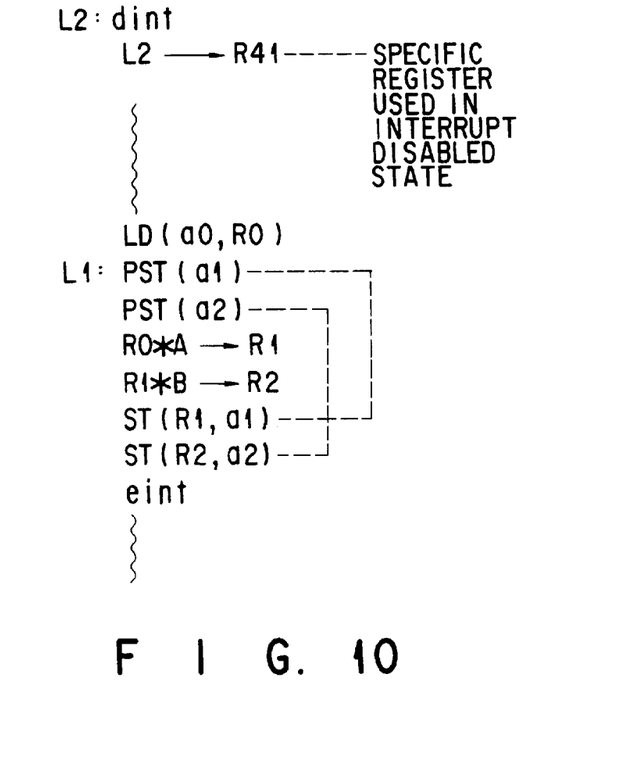
FIG. 10 shows an example of a program which is run on the computer shown in FIG. 8.
Figure 11:
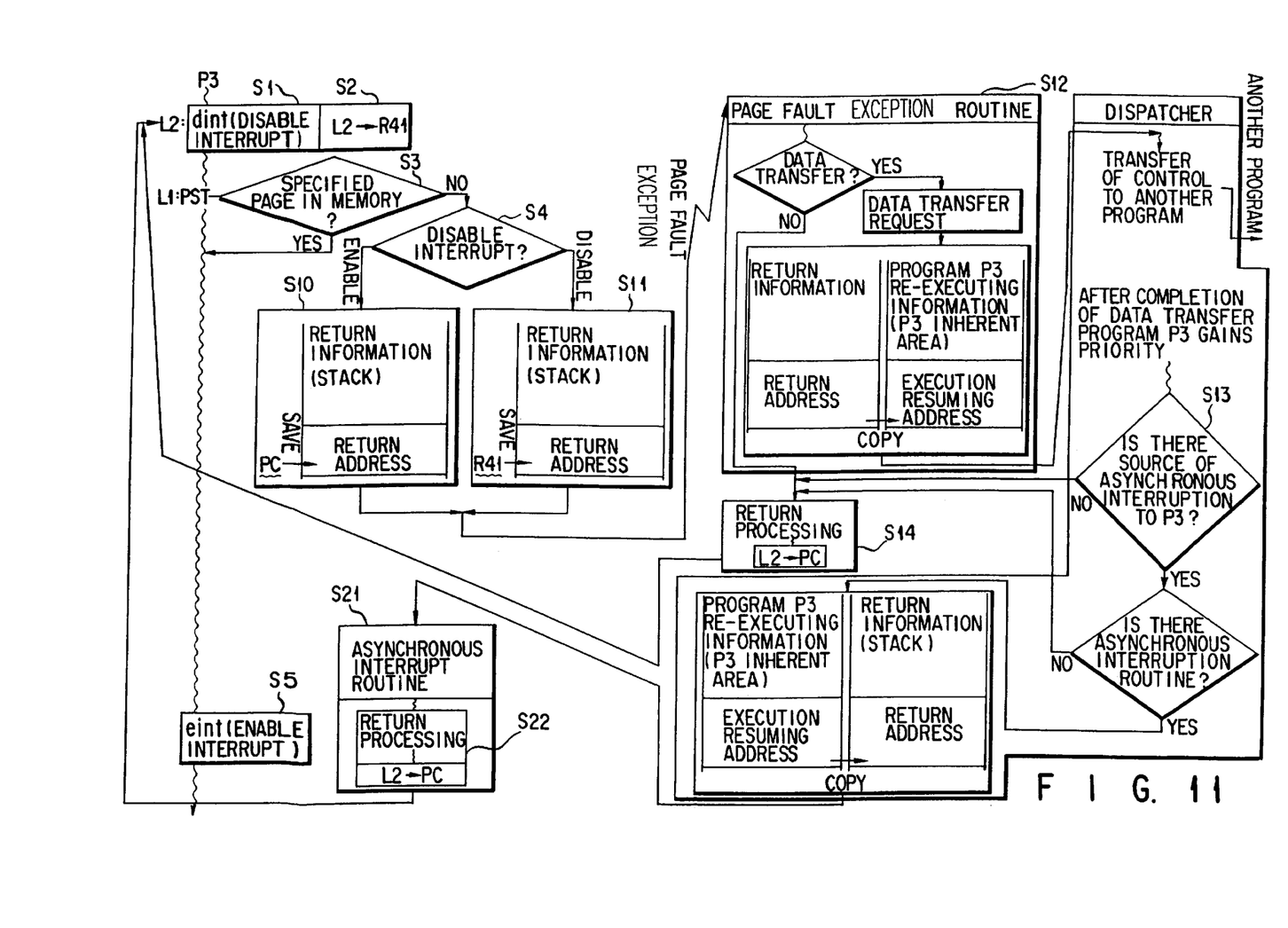
FIG. 11 is a flowchart showing the flow of processing when the program of FIG. 9 is processed by the computer shown in FIG. 8.

Turning now to the rest of the steps of FIG. 10, the step R0*A→R1 multiplies the value in register R0 by A and places the result in register R1. Similarly, the step R1*B→R2 multiplies the value in register R1 and places the result in register R2. Next, the instruction ST(R1, a1) places the value stored in register 1 in the address a1. Note that the address a1 will be in memory 47 as the pseudo-store instruction for a1 was previously executed and therefore, no page fault will be generated. Similarly, ST(R2, a2) writes the value in register R2 into the address at a2. As a pseudo-store instruction was previously executed for the address a2, this step will not cause a page fault to be generated.

Finally, when the enable interrupt instruction eint is fetched, the arithmetic control processor 51 cancels the disable interrupt state (step S5). Subsequently, the execution of the program P3 is continued.

Although the preferred embodiments of the present invention have been described above, it should be apparent that other embodiments and modifications are possible. For example, in the second and third embodiments, the return data is the address of the disable interrupt instruction. However, if the execution of the indivisible operation is assured, other addresses can be used as return data. For example in the third embodiment, the address i.e., L2+1 of the first instruction following the interrupt disable instruction, can be used as the return data for executing the program defining the indivisible operation from the beginning. Although, in the above embodiments, the present invention is applied to a computer system which processes data in page units, the present invention may be applied to a computer system which processes data in other data blocks—for example, in units of segments.

Further, in the above embodiments, in order to implement indivisible operations with software, pseudo-store instructions PST are provided, and they are executed prior to the indivisible operations. Alternatively, other instructions may be used provided that a check can be made for the presence of pages or data blocks which are necessary to execute the indivisible operations.

As described above, the present invention permits a demand paging computer system to execute indivisible operations with a combination of basic instructions.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing method in a user program execution mode for a virtual storage system having a predetermined instruction which reserves a data area in a memory, comprising the steps of:

disabling an interruption;

determining, by using the predetermined instruction, whether a data area to be accessed by an indivisible software program to be executed without being interrupted is present or not in the memory and reserving the data area in the memory when it is determined that the data area is not present in the memory;

executing the indivisible software program after it is determined that the data area is present in the memory or after the data area is reserved; and enabling the interruption, wherein the interruption disabling step includes a substep of preserving a start address of the interruption disabling step or a start address of the indivisible software program executing step as a return address; and the reserving step includes a substep of executing a page-fault processing when a page-fault exception is generated in the interruption disabled state, determining whether an asynchronous interruption has been generated after the page-fault processing, (i) returning to the start of the interruption disabling step or the start of the indivisible software program executing step by referring to the return address in the case where the asynchronous interruption has not been generated and (ii) executing an interruption processing by the asynchronous interruption in the case where the interruption has been generated, and returning to the start of the interruption disabling step or the start of the software program executing step by referring to the return address after termination of execution of the interrupt processing.

2. The method according to claim 1, in which said indivisible software program includes store instructions for storing data to a given area of the memory and the determining and reserving step includes:

a substep of executing pseudo-store, instruction which accesses the given area of the memory but does not write data into the given area of the memory, thereby generating a page-fault exception if the given area is not present in the memory.

3. The method according to claim 1, in which:

the interruption disabling step includes a substep of preserving a start address of the interruption disabling step or a start address of the indivisible software program executing step as a return address, and the indivisible software program executing step includes a substep of executing a page-fault processing when a page-fault exception is generated in the interruption disabled state, and a substep of, by referring to the return address, returning to the start of the interruption disabling step or the start of the indivisible software program executing step.

4. The method according to claim 1, in which data is processed in units of pages, and in which:

the determining and reserving step includes a substep of determining whether a page into which data are to be written by store instructions contained in the indivisible software program is present or not in the memory, and a substep of reserving the pages in the memory when the page is not present.

5. The method according to claim 4, in which the reserving substep includes:

executing a pseudo-store instruction which accesses a page in the memory necessary for the indivisible software program but does not manipulate data to reserve the page.

6. The method according to claim 4, further comprising the steps of:

disabling an interruption prior to the reserving substep;

preserving start address of the interruption disabling step or a start address of the indivisible software program executing step as a return address;

releasing the interruption disabled state after the termination of the indivisible software program executing step;

executing a paging process when a page-fault exception is generated in the interruption disabled state; and referring to the return address and returning to the start of the interruption disabling step or the start of the indivisible software program executing step after the termination of execution of the paging process.

7. The method according to claim 6, further comprising the steps of:

determining whether an asynchronous interruption has been generated after the termination of execution of the paging process;

executing the processing of an asynchronous interruption processing in a case where the asynchronous interruption has been generated; and referring to the return address after the termination of the execution of the asynchronous interruption processing, and returning to the start of the interruption disabling step or the start of the interruption processing executing step.

8. A virtual-storage data processor comprising:

first storage means for storing data;

second storage means for storing a copy of part of the contents stored in said first storage means;

third storage means for storing a user program including a set of instructions for defining an indivisible operation to be executed without being interrupted and a specific instruction, said set of instruction containing instructions accessing said second storage means, and said specific instruction accessing said second storage means and reserving data to be accessed by said set of instructions;

executing means, connected to said second and third storage means, for executing said user program stored in said third storage mean; and transferring means connected with said first and second storage means and responsive to said executing means for transferring the data to be accessed from said first storage means to said second storage means, when the data to be accessed is not present in said second storage means, wherein said executing means prevents the generation of interruptions during the expect on of the indivisible operation by transferring data required by the indivisible operation into said second storage means by executing said specific instruction prior to the execution of the indivisible operation, and executes an asynchronous interrupt processing when an asynchronous interruption is generated during the execution of the indivisible operation, returning to the execution point of the indivisible operation or returning during to the execution point of the preventing of interrupts, and thereafter implementing the indivisible operation in a user program execution mode.

9. The data processor according to claim 8, in which said user program includes an asynchronous interruption disabling instruction for disabling asynchronous interruptions prior to the execution of the indivisible operation and an asynchronous interruption enabling instruction for enabling asynchronous interruptions after the execution of the indivisible operation; and said executing means includes means for keeping a start address of the asynchronous interruption disabling instruction or an address of a first instruction of the set of instructions as a return address, and re-executing means for executing an asynchronous interruption routine when an exception which cannot be disabled in the asynchronous interruption disabled state is generated during the execution of the user program and, after the execution of the asynchronous interruption routine, resuming processing from the asynchronous interruption disabling instruction or the first instruction of the set of instructions, in accordance with the return address kept in said keeping means.

10. The data processor according to claim 8, in which said program includes an asynchronous interruption disabling instruction for disabling asynchronous interruptions prior to the execution of the indivisible operation, and an asynchronous interruption enabling instruction for enabling asynchronous interruptions after the execution of the indivisible operation; and said executing means includes keeping means for keeping a start address of the interruption disabling instruction or a first instruction of the set of instructions as a return address, and re-executing means for executing a page-fault exception routine when a page-fault exception which cannot be disabled in the asynchronous interruption disabled state is generated, determining whether an asynchronous interruption has been generated after the execution of the page-fault exception routine, referring to the return address kept in said keeping means to resume processing from a start of the asynchronous interruption disabling instruction or the first instruction of the set of instructions, when the asynchronous interruption has not been generated, executing processing for the asynchronous interruption when it has been generated, and referring to the return address kept in said keeping means, to resume processing from a start of the asynchronous interruption disabling instruction or the first instruction of the set of instruction.

11. The data processor according to claim 8, in which said data is processed in unit of pages, and said transferring means includes means responsive to the execution of the program by said executing means for determining whether a page into which data are to be written by store instructions included in the set of instructions stored in said second storage means, and reserving the page in said second memory means when the page is not present.

12. The data processor according to claim 11, in which said program includes asynchronous interruption disabling instruction for disabling asynchronous interruptions prior to the execution of the indivisible operation, and an asynchronous interruption enabling instruction for enabling asynchronous interruptions after the execution of the indivisible operations; and said executing means includes means for keeping a start address of said asynchronous interruption disabling instruction or a first instruction of the set of instruction as a return address, and reexecuting means for executing a paging process when a page fault exception is generated during the execution of the program and, after the execution of the paging process, resuming processing from a start of the asynchronous interruption disabling instruction or the first instruction of the set of instructions, in accordance with the return address kept in said keeping means.

13. The data processor according to claim 11, in which said program includes an asynchronous interruption disabling instruction for disabling asynchronous interruptions prior to the execution of the indivisible operation, and an asynchronous interruption enabling instruction for enabling asynchronous interruptions after the execution of the indivisible operation; and said executing means includes keeping means for keeping a start address of said asynchronous interruption disabling instruction or first instruction of the set of instructions as a return address, and means for executing a paging process when a page fault exception is generated during the execution of the program, checking whether an asynchronous interruption has been generated after the execution of the paging process, resuming processing from the asynchronous interruption disabling instruction or the first instruction of the instruction set, in accordance with the return address kept in said keeping means, when no asynchronous interruption has been generated, executing processing for the asynchronous interruption when it has been generated, and referring to the return address kept in said keeping means, to resume processing from the asynchronous interruption disabling instruction or the first instruction of the instruction set, after the execution of the processing of the asynchronous interruption.

* * * * *